United States Patent
Reddy et al.

(10) Patent No.: US 10,094,028 B2
(45) Date of Patent: Oct. 9, 2018

(54) CORROSION INHIBITING AQUEOUS EMULSIONS CONTAINING HYDROPHILIC GROUP FUNCTIONALIZED SILICONE POLYMERS

(71) Applicant: Halliburton Energy Services, Inc., Houston, TX (US)

(72) Inventors: Baireddy Raghava Reddy, The Woodlands, TX (US); Natalie Lynn Pascarella, Houston, TX (US); Tiffany Anne Pinder, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/308,379

(22) PCT Filed: Aug. 26, 2014

(86) PCT No.: PCT/US2014/052732
§ 371 (c)(1),
(2) Date: Nov. 2, 2016

(87) PCT Pub. No.: WO2016/032445
PCT Pub. Date: Mar. 3, 2016

(65) Prior Publication Data
US 2017/0051415 A1    Feb. 23, 2017

(51) Int. Cl.
*C23F 11/04*      (2006.01)
*C09K 8/54*       (2006.01)
*C23F 11/173*     (2006.01)
*C09K 8/74*       (2006.01)

(52) U.S. Cl.
CPC ............... *C23F 11/04* (2013.01); *C09K 8/54* (2013.01); *C09K 8/74* (2013.01); *C23F 11/173* (2013.01); *C09K 2208/32* (2013.01)

(58) Field of Classification Search
CPC .......... C23F 11/04; C23F 11/173; C09K 8/74; C09K 8/54; C09K 2208/32
See application file for complete search history.

(56) References Cited

U.S. PATENT DOCUMENTS

| | | | |
|---|---|---|---|
| 4,322,306 A | 3/1982 | Dill | |
| 4,539,122 A | 9/1985 | Son et al. | |
| 5,332,431 A * | 7/1994 | Yokoi | C09D 5/165 106/15.05 |
| 5,697,443 A | 12/1997 | Brezinski et al. | |
| 5,756,004 A | 5/1998 | Brezinski | |
| 5,763,368 A | 6/1998 | Brezinski | |
| 5,960,878 A | 10/1999 | Nguyen et al. | |
| 6,180,057 B1 | 1/2001 | Taylor et al. | |
| 6,192,987 B1 | 2/2001 | Funkhouser et al. | |
| 6,475,431 B1 | 11/2002 | Naraghi et al. | |
| 7,799,434 B2 * | 9/2010 | Webster | C08G 77/388 428/447 |
| 7,960,316 B2 | 6/2011 | Cassidy et al. | |
| 7,994,101 B2 | 8/2011 | Cassidy et al. | |
| 8,058,211 B2 | 11/2011 | Cassidy et al. | |
| 8,318,085 B2 | 11/2012 | Cassidy et al. | |
| 8,361,937 B2 | 1/2013 | Cassidy et al. | |
| 2007/0018135 A1 | 1/2007 | McCormick et al. | |
| 2010/0087340 A1 | 4/2010 | Cassidy et al. | |
| 2014/0087975 A1 | 3/2014 | Mirsa et al. | |

OTHER PUBLICATIONS

International Search Report and Written Opinion for International Application No. PCT/US2014/052732 dated May 27, 2015. (13 pages).
Siltech Corporation, Siltech® E-2145: Amino Siloxane Emulsion, Technical Data Sheet, Sep. 2009, http://www.siltech.com/index.php/silicone-emulsions. (1 page).

* cited by examiner

*Primary Examiner* — Timothy C Cleveland
(74) *Attorney, Agent, or Firm* — Haynes and Boone, LLP

(57) ABSTRACT

Methods of inhibiting corrosion of metal surfaces by aqueous acids are described. The methods include combining a corrosion inhibiting aqueous emulsion with the aqueous acid solution to form a treatment fluid and contacting the metal surface with the treatment fluid. The corrosion inhibiting aqueous emulsion includes one or more silicone polymers having hydrophilic functional groups.

19 Claims, No Drawings

CORROSION INHIBITING AQUEOUS EMULSIONS CONTAINING HYDROPHILIC GROUP FUNCTIONALIZED SILICONE POLYMERS

BACKGROUND

The present invention relates generally to methods of inhibiting the corrosion of metal surfaces by aqueous acids in oil and gas operations.

Subterranean hydrocarbon containing formations penetrated by well bores are often treated with aqueous acids to stimulate the production of hydrocarbons therefrom. One such treatment, generally referred to as "acidizing" involves the introduction of an aqueous acid solution into a subterranean formation under pressure so that the acid solution flows through the pore spaces of the formation. The acid reacts with acid soluble materials contained in the formation thereby increasing the size of the pore spaces, thus increasing the permeability of the formation. Another production stimulation treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

Acidizing and fracture-acidizing solutions typically contain, for example, 15% to 28% by weight of hydrochloric acid, which can cause corrosion of metal surfaces in pumps, tubular goods and equipment used to introduce the aqueous acid solutions into the subterranean formations to be treated. The expense associated with repairing or replacing corrosion damaged tubular goods and equipment can be problematic. The corrosion of tubular goods and down-hole equipment is increased by the elevated temperatures encountered in deep formations, and the corrosion results in at least the partial neutralization of the acid before it reacts with acid-soluble materials in the formations, which leads to added expense and complications because additional quantities of the acid often are required to achieve the desired result.

Aqueous acid solutions are also utilized in a variety of other industrial applications to contact and react with acid soluble materials. In such applications, metal surfaces are contacted with the acid and any corrosion of the metal surfaces is highly undesirable. In addition, other corrosive fluids such as aqueous alkaline solutions, heavy brines, petroleum streams containing acidic materials and the like corrode metal surfaces in tubular goods, pipelines and pumping equipment during transportation, storage and treatment phases.

A variety of metal corrosion inhibiting additives have been developed for aqueous acid fluids. Typical corrosion inhibitors for use in acidizing operations are based on, for example, propargyl alcohols, long chain hydrophobic tertiary amines, or quaternary ammonium compounds. These compounds, however, are known to be toxic, especially propargyl alcohol based materials, which have been found to be very effective corrosion inhibitors. In addition to their toxic nature, these corrosion inhibitors are typically supplied as solutions in volatile organic solvents, which is unfavorable because of increased flammability.

Thus, there is a continuing need for improved and more environmentally benign methods and compositions for inhibiting acid corrosion in oil and gas operations.

DETAILED DESCRIPTION

According to several exemplary embodiments, a method is provided for the inhibition of acid corrosion of a metal surface using environmentally friendly corrosion inhibiting emulsions. The corrosion inhibiting emulsions described herein are non-flammable oil-in-water aqueous emulsions, with substantially improved health and reactivity ratings.

The corrosion inhibiting aqueous emulsions include one or more silicone polymers having hydrophilic functional groups in the internal phase (also called the dispersed or discontinuous phase or the oil phase). In several exemplary embodiments, the silicone polymers are end-functionalized with one or more hydrophilic functional groups. The hydrophilic functional groups can include one or more of amino, hydroxyl, sulfhydryl, and carboxyl groups. A specific example of an amino-containing group present as the hydrophilic functional group on a silicone polymer is a (3-[2-aminoethyl]aminopropyl) dimethoxysilyl oxy group. The silicone polymers used in several exemplary compositions and methods of the present invention include polydimethylsiloxane.

According to several exemplary embodiments, the one or more silicone polymers are present in an amount of about 30% to about 60% by weight of the corrosion inhibiting aqueous emulsion. In several exemplary embodiments, the corrosion inhibiting aqueous emulsion also includes water and an emulsifier. For example, water, present as the continuous phase, may be present in the corrosion inhibiting aqueous emulsion in an amount of about 35% to about 65% by weight of the corrosion inhibiting aqueous emulsion. The emulsifier may be present in the corrosion inhibiting aqueous emulsion in an amount of about 5% by weight of the corrosion inhibiting aqueous emulsion. In several exemplary embodiments, the emulsifier includes a non-ionic emulsifier. In an embodiment, the emulsifier is a polymeric non-ionic emulsifier. A specific example of a polymeric non-ionic emulsifier is poly(oxy-1,2-ethanediyl)-α-[3,5-dimethyl-1-(2-methylpropyl)hexyl]-Ω-hydroxy compound.

The droplet size of the emulsified phase in the aqueous emulsions of the present invention may range from nanometers (nm) to microns (μm) in diameter. The diameter range can be in the range of about 3 nm to 125 microns in diameter, alternately 10 nm to 75 microns in diameter.

In several exemplary embodiments, the corrosion inhibiting aqueous emulsion also includes a corrosion inhibitor intensifier. The corrosion inhibitor intensifier, in several exemplary embodiments, is capable of demulsifying the emulsion in the presence of a metal surface. Corrosion inhibitor intensifiers function to activate corrosion inhibitor components so that they improve the effectiveness of the corrosion inhibitors compared to when they are used by themselves. According to several exemplary embodiments, the corrosion inhibitor aqueous emulsions include a corrosion inhibitor intensifier such as metal ions, iodide ions, or certain organic compounds. Examples of such corrosion inhibitor intensifiers are cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing intensifiers such as a mixture of formic acid and potassium iodide. According to several exemplary embodiments, when a corrosion inhibitor intensifier is included in the corrosion inhibiting aqueous emulsion, it is generally present in an amount of from about 0.1% to about 40.0% by weight of the emulsion. In an embodiment, the demulsification of the aqueous emulsion containing the corrosion inhibitors of the present invention can be facilitated at elevated temperatures by the use of divalent or polyvalent metal salts such as calcium chloride and magnesium chloride in the treatment fluid.

Aqueous emulsions of silicone polymers are commercially available as a blend of one or more silicone polymers, water, and one or more emulsifiers from Siltech Corporation in Canada under the tradename Siltech®. These commercially available aqueous emulsions can contain amino-functionalized silicones and hydroxy-functionalized silicones. In an embodiment, the amino-functionalized silicone polymer can be in cross-linked form.

According to several exemplary embodiments, the method of inhibiting corrosion of a metal surface contacted by an aqueous acid solution includes combining a corrosion inhibiting aqueous emulsion with an aqueous acid solution to form a treatment fluid and then contacting the metal surface with the treatment fluid.

According to several exemplary embodiments, the corrosion inhibiting aqueous emulsion is combined with the aqueous acid solution in an amount of from about 0.1% to about 10.0% by weight of the aqueous acid solution.

The metals that can be protected from corrosion by the corrosion inhibiting methods and compositions of the present invention include, but are not limited to, steel grade N-80, J-55, P-110, QT800, HS80, and other common oil field alloys such as 13Cr, 25Cr, Incoloy 825 and 316L.

According to several exemplary embodiments, the acids in the aqueous acid solutions in which the corrosion inhibiting methods and compositions are effective include, but are not limited to, hydrochloric acid (HCl), acetic acid, formic acid, hydrofluoric acid, and mixtures of these acids. In some embodiments, the aqueous acid solution includes an acid or mixture of acids in an amount up to about 32% by weight thereof In some embodiments, the acid is HCl and is present in the aqueous acid solution in an amount of from about 5% to about 20% by weight of the aqueous acid solution. In several exemplary embodiments, the acid is HCl and is present in the aqueous acid solution in an amount of about 15% by weight of the aqueous acid solution.

Without being bound by theory, it is believed that the corrosion inhibiting aqueous emulsions function by forming a protective film which can be a water repellant film on the metal surface when used in acidizing treatments. The protective film is not easily washed off the surface of the metal by virtue of bonding between the hydrophilic functional groups of the silicone polymer and the metal surface. The corrosion inhibiting aqueous emulsion, even when combined with the aqueous acid solution, remains an aqueous emulsion in the absence of a metal surface.

When the combination of the corrosion inhibiting aqueous emulsion and aqueous acid solution contact a metal surface, the emulsion is demulsified or broken down into its components. The silicone polymer is released and coats the metal surface to protect the metal surface from corrosion. In several exemplary embodiments, a corrosion inhibitor intensifier is included in the emulsion and is capable of demulsifying the emulsion in the presence of a metal surface.

The following examples are illustrative of the compositions and methods discussed above and are not intended to be limiting.

EXAMPLE 1

Corrosion Testing

A common mode of testing the effectiveness of a corrosion inhibitor involves simulating downhole corrosive conditions by using a water bath and measuring corrosion rates. Corrosion rates were determined at atmospheric pressure using one metallurgy coupon (N-80 steel) placed in a glass jar containing a simulated treatment fluid that combined an aqueous mixture of 15% HCl and 5% solutions of various silicone aqueous polymer emulsions. The N-80 steel coupons were exposed to the treatment fluid at 180° F. for 20 hours. The coupons were then removed, cleaned, dried, and weighed to obtain their weight loss. The corrosion value is reported in $lb/ft^2$.

Table 1 lists the silicone aqueous polymer emulsions that were tested, along with their silicone concentration and chemical composition.

TABLE 1

| Commercial Name | % Silicone in the emulsion | Composition |
|---|---|---|
| Non-Functionalized Polydimethylsiloxane | | |
| Siltech ® E-660 | 35% | Mixture of high and low viscosity silicone |
| Siltech ® E-4080 | 60% | Very high molecular weight silicone |
| Amino-functionalized Silicones | | |
| Siltech ® E-2145 | 60% | Physical mixture of non-functionalized and amino-functionalized silicones |
| Siltech ® E-4135 | 35% | Microemulsion of amino-functionalized silicone |
| Siltech ® E-2150 | 30% | Highly crosslinked amino silicone |
| Hydroxy-functionalized Silicones | | |
| Siltech ® E-2171 | 60% | Hydroxy terminated silicone—thermally curable |

The results of the tests are provided below in Table 2.

TABLE 2

| Commercial Name | % Silicone in the treatment fluid | Composition | Corrosion (lbs/ft²) |
|---|---|---|---|
| None | None | Only 15% HCl (Control Test) | 0.32 |
| Non-Functionalized Polydimethylsiloxane | | | |
| Siltech ® E-660 | 1.75 | Mixture of high and low viscosity silicone | 0.23 |
| Siltech ® E-4080 | 3 | Very high molecular weight silicone | 0.22 |
| Amino-functionalized Silicones | | | |
| Siltech ® E-2145 | 3 | Physical mixture of non-functionalized and amino-functionalized silicones | 0.23 |

TABLE 2-continued

| Commercial Name | % Silicone in the treatment fluid | Composition | Corrosion (lbs/ft$^2$) |
|---|---|---|---|
| Siltech ® E-4135 | 1.75 | Microemulsion of amino-functionalized silicone | 0.15 |
| Siltech ® E-2150 | 1.5 | Highly crosslinked amino silicone | 0.19 |
| | | Hydroxy-Functionalized Silicones | |
| Siltech ® E-2171 | 3 | Hydroxy terminated silicone—thermally curable | 0.15 |

The results in Table 2 show that acid corrosion of N-80 steel was reduced to different degrees by the silicone polymer emulsions. As can be seen, the non-functionalized polydimethylsiloxanes, namely Siltech® E-660 and Siltech® E-4080 and the mixture of non-functionalized and amino-functionalized silicones, namely Siltech® E-2145 performed better than the 15% HC1 control test. The corrosion protection was significantly better when the silicone polymers were functionalized with amino or hydroxyl groups, as seen for Siltech® E-2150, Siltech® E-4135, and Siltech® E-2171. The microemulsified amino silicone, Siltech® E-4135, appeared to be particularly effective when compared on a gram-per-gram basis, followed closely by the cross-linked amino silicone compound, Siltech® E-2150.

Although the corrosion rates may not be in a desired range, these results demonstrate that with optimization, desired corrosion rates may be achieved with these materials. For example, the silicone molecular weight, number of hydrophilic groups per molecule, blends with synergistic compounds, etc., can be optimized. Additional components, such as corrosion inhibitor intensifiers, can also be incorporated to boost performance.

The appeal of the class of corrosion inhibiting aqueous emulsions according to several exemplary embodiments can be seen by comparing these emulsions with one of the most effective corrosion inhibitors available on the market, HAI-OS™ acid inhibitor, which is a propargyl alcohol based product marketed by Halliburton Energy Services, Inc. Table 3 below compares the environmental data of the HAI-OS™ acid inhibitor with Siltech® E-2145. As shown in Table 3, Siltech® E-2145 is the less toxic, more environmentally safe corrosion inhibitor.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of inhibiting corrosion of a metal surface contacted by an aqueous acid solution comprising:
    combining a corrosion inhibiting aqueous emulsion with the aqueous acid solution to form a treatment fluid, the corrosion inhibiting aqueous emulsion comprising an internal phase of one or more silicone polymers consisting of a polydimethylsiloxane backbone and hydrophilic functional groups, wherein the hydrophilic functional groups consist of one or more of a hydroxyl group, an amino group, a sulfhydryl group, and a carboxyl group; and
    contacting the metal surface with the treatment fluid.

2. The method of claim 1, wherein the corrosion inhibiting aqueous emulsion is combined with the aqueous acid solution in an amount in the range of about 0.1% to about 10.0% by weight of the aqueous acid solution.

3. The method of claim 1, wherein the one or more silicone polymers are present in an amount of about 30% to about 60% by weight of the corrosion inhibiting aqueous emulsion.

4. The method of claim 1, wherein the corrosion inhibiting aqueous emulsion further comprises water and an emulsifier.

TABLE 3

| | HAI-OS ™ | Siltech ® E-2145 |
|---|---|---|
| HMIS (Note 1) Rating | 2-3-0 | 1-0-0 |
| Global Symbol | Toxic Highly Flammable | Xi (Irritant) |
| R Phrases (Toxicity ratings according to GHS (Note 2) system) | R11, R34, R23/24/25, R39/23/24/25, R52/53 (aquatic toxicity) | R36 (irritant to eyes) |
| S Phrases (Precautions according GHS System) | S7, S16, S26, S28, S38, S45, S46, S61, S36/37 | S24 (Avoid contact w/ skin) S26 (Rinse eyes in case of contact and seek medical) |
| LD50 for Propargyl alcohol | 20 mg/kg (oral) 16 mg/kg (dermal) | N/A (Note 3) |
| LD 50 for E-2145 | N/A | Not expected to be toxic—no specific details available. Based on parent silicone compounds, no single-shot exposure toxicity expected. Not toxic to aquatic organisms |

Note 1—Hazardous Material Identification System (HMIS)
Note 2—Globally Harmonized System (GHS)
Note 3—Not Available (N/A)

5. The method of claim 4, wherein the water is present in an amount of about 35% to about 65% by weight of the corrosion inhibiting aqueous emulsion and the emulsifier is present in an amount of about 5% by weight of the corrosion inhibiting aqueous emulsion.

6. The method of claim 4, wherein the emulsifier comprises a non-ionic emulsifier.

7. The method of claim 1, wherein the corrosion inhibiting aqueous emulsion further comprises a corrosion inhibitor intensifier.

8. The method of claim 7, wherein the corrosion inhibitor intensifier is capable of demulsifying the emulsion in the presence of a metal surface.

9. The method of claim 1, wherein the aqueous acid solution comprises hydrochloric acid.

10. The method of claim 9, wherein the hydrochloric acid is present in an amount of about 5% to 20% by weight of the aqueous acid solution.

11. The method of claim 1, wherein the metal surface is contacted with the treatment fluid as part of an acidizing treatment.

12. The method of claim 1, wherein the corrosion inhibiting aqueous emulsion is present in the treatment fluid as an aqueous emulsion, in the absence of a metal surface.

13. A method of inhibiting corrosion of a metal surface contacted by an aqueous acid solution comprising:
   combining a corrosion inhibiting aqueous emulsion with the aqueous acid solution to form a treatment fluid, the corrosion inhibiting emulsion comprising one or more silicone polymers consisting of a polydimethylsiloxane backbone end-functionalized with amino groups, hydroxyl groups, or both; and
   contacting the metal surface with the treatment fluid.

14. The method of claim 13, wherein the metal surface is contacted with the treatment fluid as part of an acidizing treatment.

15. The method of claim 13, wherein the corrosion inhibiting aqueous emulsion is present in the treatment fluid as an aqueous emulsion, in the absence of a metal surface.

16. A method of inhibiting corrosion of a metal surface contacted by an aqueous acid solution comprising:
   combining a corrosion inhibiting aqueous emulsion with the aqueous acid solution to form a treatment fluid, the corrosion inhibiting aqueous emulsion comprising a polydimethylsiloxane in an amount of about 30% to about 60% by weight of the corrosion inhibiting aqueous emulsion, wherein the polydimethylsiloxane consists of a polydimethylsiloxane backbone end-functionalized with amino groups or hydroxyl groups; and
   contacting the metal surface with the treatment fluid.

17. The method of claim 16, wherein the metal surface is contacted with the treatment fluid as part of an acidizing treatment.

18. The method of claim 16, wherein the corrosion inhibiting aqueous emulsion is present in the treatment fluid as an aqueous emulsion, in the absence of a metal surface.

19. The method of claim 16, wherein the amino groups comprise a (3-[2-aminoethyl]aminopropyl) group.

* * * * *